United States Patent
Kim et al.

(10) Patent No.: US 11,614,660 B2
(45) Date of Patent: Mar. 28, 2023

(54) TRANSMITTANCE-VARIABLE FILM CAPABLE OF CONTROLLING PRETILT OF LIQUID CRYSTAL INTERFACE

(71) Applicant: LG Chem, Ltd., Seoul (KR)

(72) Inventors: Jung Woon Kim, Daejeon (KR); Su Young Ryu, Daejeon (KR); Moon Soo Park, Daejeon (KR); Byoung Kun Jeon, Daejeon (KR); Sin Young Kim, Daejeon (KR); Ji Youn Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/342,085

(22) PCT Filed: Oct. 18, 2017

(86) PCT No.: PCT/KR2017/011505
§ 371 (c)(1),
(2) Date: Apr. 15, 2019

(87) PCT Pub. No.: WO2018/080089
PCT Pub. Date: May 3, 2018

(65) Prior Publication Data
US 2019/0250465 A1    Aug. 15, 2019

(30) Foreign Application Priority Data

Oct. 28, 2016  (KR) .................. 10-2016-0141785
Oct. 18, 2017  (KR) .................. 10-2017-0134946

(51) Int. Cl.
*G02F 1/1337*    (2006.01)
*G02F 1/1339*    (2006.01)
(Continued)

(52) U.S. Cl.
CPC .......... *G02F 1/133711* (2013.01); *G02B 5/30* (2013.01); *G02B 26/02* (2013.01);
(Continued)

(58) Field of Classification Search
CPC combination set(s) only.
See application file for complete search history.

(56) References Cited

U.S. PATENT DOCUMENTS 5,155,610 A    10/1992  Hikmet et al.
5,529,818 A *   6/1996  Tsuda ................ G02F 1/133711
                                                                 428/1.2

(Continued)

FOREIGN PATENT DOCUMENTS

CN        1800936 A       7/2006
CN      102023414 A       4/2011
(Continued)

OTHER PUBLICATIONS

Search report from International Application No. PCT/KR2017/011505, dated Jan. 12, 2018.

(Continued)

*Primary Examiner* — Lauren Nguyen
(74) *Attorney, Agent, or Firm* — Lerner, David, Littenberg, Krumholz & Mentlik, LLP

(57) ABSTRACT

A transmittance-variable film and a use thereof, where the transmittance-variable film can control pretilt of a liquid crystal interface by applying a liquid crystal alignment film containing splay oriented liquid crystal molecules, and can vertically and horizontally orient a liquid crystal layer or a liquid crystal interface according to an average tilt angle of the liquid crystal alignment film to ensure uniformity of driving and fast response speed. In addition, by applying a liquid crystal alignment film, the transmittance-variable film can be implemented in various modes with a simple coating- (Continued)

drying-curing method excluding the rubbing process by controlling an arrangement of liquid crystal molecules in a liquid crystal alignment film other than the pretilt control method using the conventional rubbing method.

11 Claims, 4 Drawing Sheets

(51) Int. Cl.
  *G02B 26/02* (2006.01)
  *G02F 1/137* (2006.01)
  *G02B 5/30* (2006.01)
(52) U.S. Cl.
  CPC ...... *G02F 1/13392* (2013.01); *G02F 1/13725* (2013.01); *G02F 1/13737* (2013.01); *G02F 1/133788* (2013.01); *G02F 1/13373* (2021.01); *G02F 1/133715* (2021.01); *G02F 1/133726* (2021.01); *G02F 1/133738* (2021.01); *G02F 1/133742* (2021.01); *G02F 1/133773* (2021.01); *G02F 2203/01* (2013.01)

(56) References Cited

U.S. PATENT DOCUMENTS

| | | | | |
|---|---|---|---|---|
| 6,094,252 | A * | 7/2000 | Itoh | G02F 1/13725 349/180 |
| 6,157,427 | A | 12/2000 | Saynor et al. | |
| 2004/0160561 | A1* | 8/2004 | Koma | G02F 1/133753 349/139 |
| 2005/0179003 | A1 | 8/2005 | Heckmeier et al. | |
| 2007/0019139 | A1 | 1/2007 | Matsubara | |
| 2007/0216837 | A1* | 9/2007 | Ono | G02F 1/1395 349/117 |
| 2008/0124493 | A1* | 5/2008 | Sawatari | G02F 1/133711 428/1.2 |
| 2013/0222751 | A1* | 8/2013 | Xu | G02F 1/133788 445/24 |
| 2014/0036175 | A1 | 2/2014 | Morishima et al. | |
| 2015/0029452 | A1 | 1/2015 | Ogawa et al. | |
| 2015/0378193 | A1* | 12/2015 | Song | G02F 1/13725 349/96 |
| 2016/0291357 | A1 | 10/2016 | Min et al. | |

FOREIGN PATENT DOCUMENTS

| | | |
|---|---|---|
| JP | H04234018 A | 8/1992 |
| JP | H1172621 A | 3/1999 |
| JP | 2000122066 A | 4/2000 |
| JP | 2010032860 A | 2/2010 |
| JP | 2010230759 A | 10/2010 |
| JP | 5714682 B2 | 5/2015 |
| KR | 20060080129 A | 7/2006 |
| KR | 20080037888 A | 5/2008 |
| KR | 20110031140 A | 3/2011 |
| KR | 20120008425 A | 1/2012 |
| KR | 20130086992 A | 8/2013 |
| KR | 20150105266 A | 9/2015 |
| KR | 20160117344 A | 10/2016 |
| TW | I231310 B | 4/2005 |
| TW | 200627007 A | 8/2006 |
| TW | 201248219 A | 12/2012 |
| TW | 201339285 A | 10/2013 |
| WO | 2016159672 A1 | 10/2016 |

OTHER PUBLICATIONS

Search report from OA dated Jul. 3, 2018, from Taiwan Application No. 106135806.
Search report from OA dated Oct. 19, 2018 from Taiwan Application No. 106135806.
Supplemental European Search Report for Application No. EP 17863589.2, dated Sep. 12, 2019, 2 pages.
Chiniese Search Report for Application No. 201780052229.1 dated Aug. 12, 2020, 2 pages.

* cited by examiner

[Figure 1]
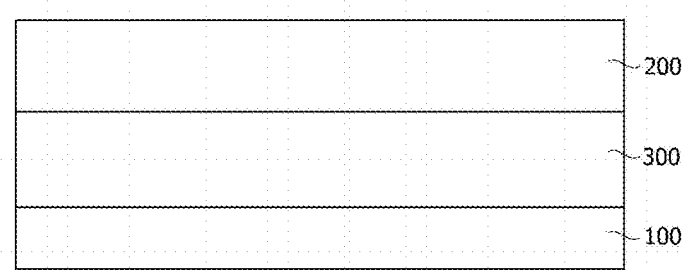
[Figure 2]
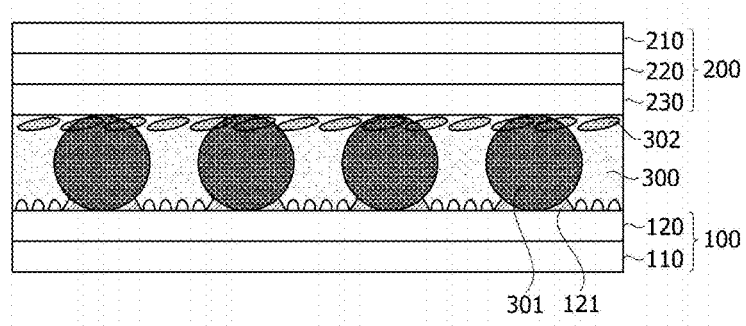
[Figure 3]
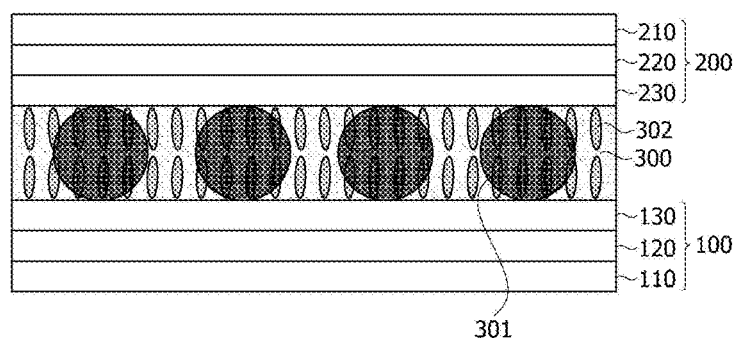

[Figure 4]
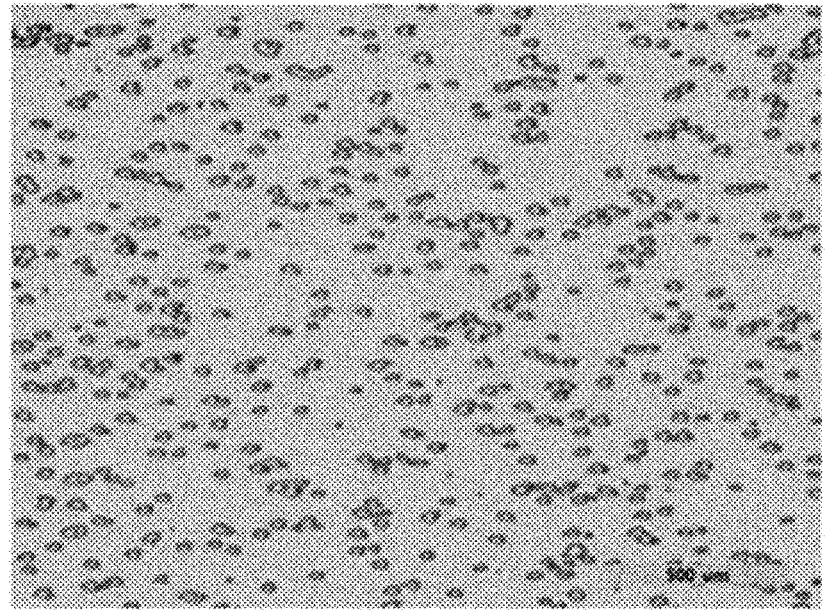
[Figure 5]
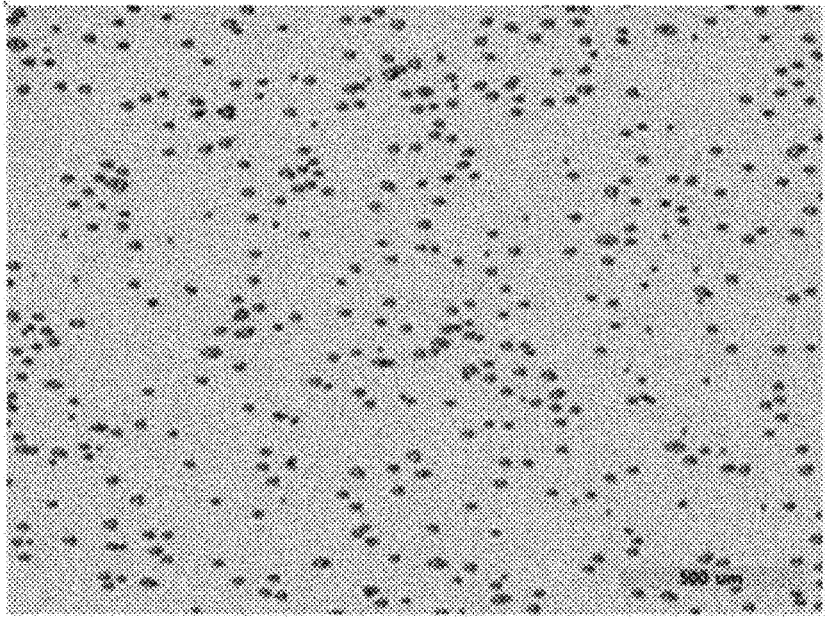

[Figure 6]
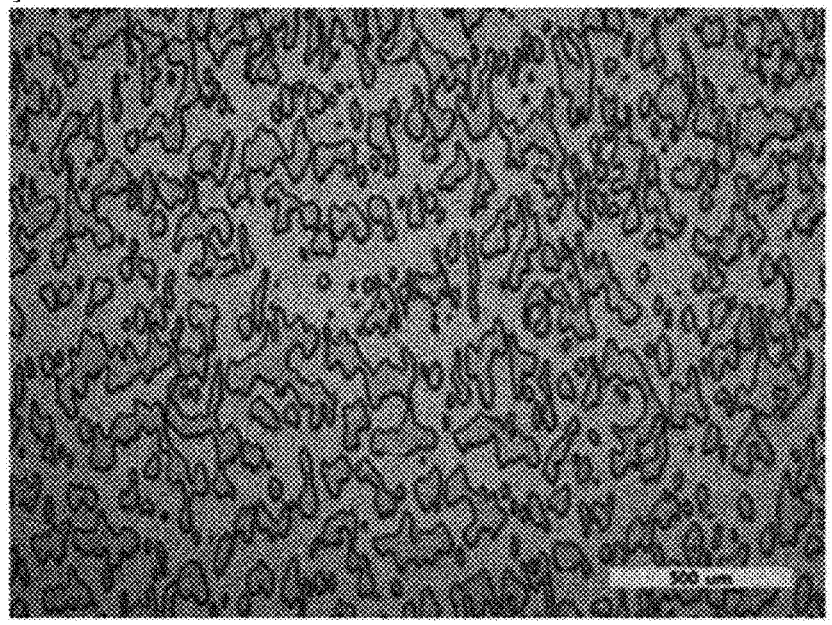
[Figure 7]
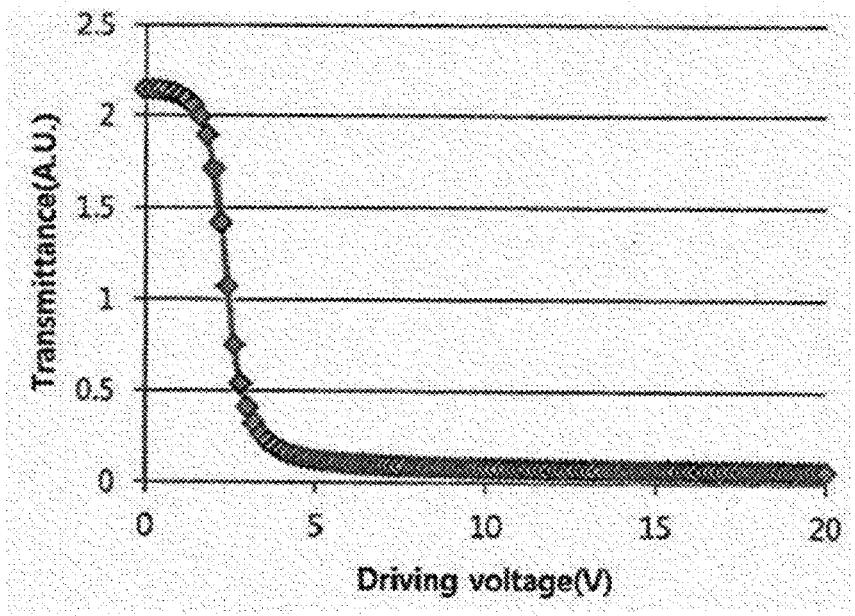

[Figure 8]
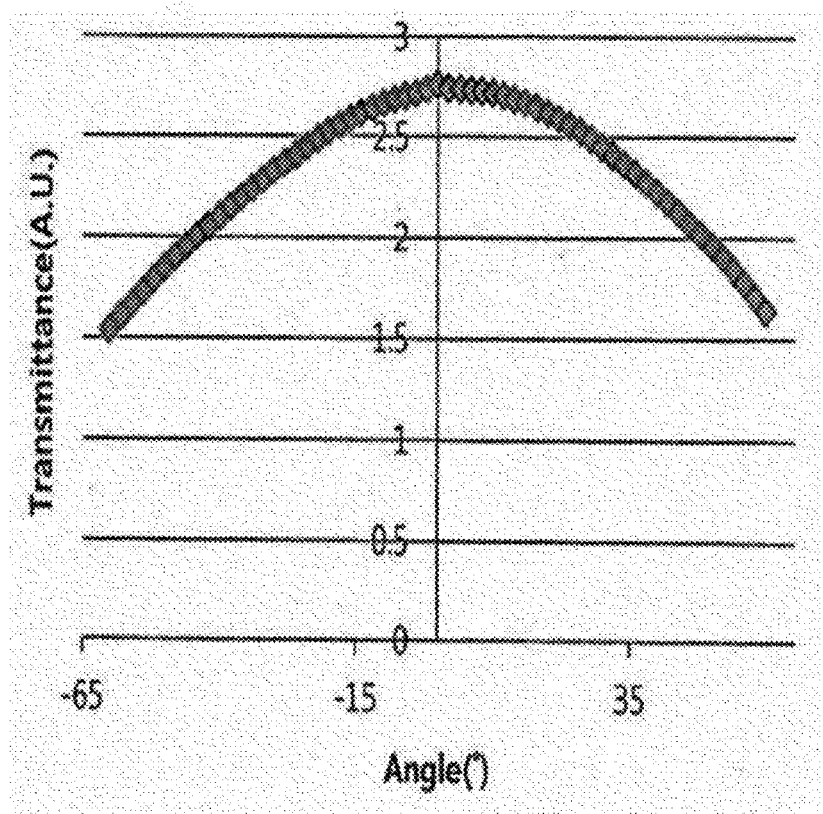

ly oriented liquid crystals and capable of vertically and horizontally orienting a liquid crystal layer or a liquid crystal interface according to an average tilt angle of the liquid crystal alignment film to ensure uniformity of driving and fast response speed, and a use thereof.

It is another object of the present application to provide a transmittance-variable film capable of realizing various modes with a simple coating-drying-curing method excluding the rubbing process by controlling an arrangement of liquid crystal molecules in a liquid crystal alignment film other than the pretilt control method using the conventional rubbing method, and a use thereof.

Technical Solution

The present application relates to a transmittance-variable film. An exemplary transmittance-variable film of the present application may comprise a first substrate (100), a transmittance-variable liquid crystal layer (300) and a second substrate (200) in sequence. At least one of the first substrate (100) and the second substrate (200) may comprise a liquid crystal alignment film (not shown) containing splay oriented liquid crystals.

The transmittance-variable film of the present application can control the pretilt of the liquid crystal interface without using a conventional rubbing process by applying a liquid crystal alignment film comprising splay oriented liquid crystal molecules and can ensure uniformity of driving and fast response speed by enabling vertical orientation and horizontal orientation of the liquid crystal layer or the liquid crystal interface according to an average tilt angle of the liquid crystal alignment film.

In this specification, the liquid crystal alignment film means an alignment film containing liquid crystal molecules, and the non-liquid crystal alignment film means an alignment film containing no liquid crystal molecule. The non-liquid crystal alignment film may be, for example, a photo-alignment film to be described below.

Also, in this specification, the term "splay oriented liquid crystal" means a liquid crystal present in an oriented state where the tilt angle of the liquid crystal molecule present in the liquid crystal layer is gradually changing along the thickness direction of the liquid crystal layer.

In this specification, the pretilt may have an angle and a direction. The pretilt angle may be referred to as a polar angle, which may mean an angle in which a director of the liquid crystal forms with respect to a horizontal surface of the alignment film. The pretilt direction may be referred to as an azimuthal angle, which may mean a direction in which the director of the liquid crystal is projected on the horizontal surface of the alignment film.

In this specification, the term "director of liquid crystal" may mean a long axis when the liquid crystal has a rod shape and a normal direction axis of a discotic plane when the liquid crystal has a discotic shape.

In this specification, the term "tilt angle of liquid crystal molecule" means an angle in which one of the oriented liquid crystal molecules forms with the plane of the liquid crystal layer. Also, the term "pretilt angle" herein means the smallest tilt angle among the tilt angles of the liquid crystal molecules present in the transmittance-variable liquid crystal layer.

Furthermore, in this specification, the term "average tilt angle of liquid crystal alignment film" means an average of the tilt angles of splay oriented liquid crystal molecules contained in the liquid crystal alignment film, and the term "minimum tilt angle of liquid crystal alignment film" means the smallest tilt angle of the tilt angles of splay oriented liquid crystal molecules contained in the liquid crystal alignment film and the term "maximum tilt angle of liquid crystal alignment film" means the largest tilt angle of the tilt angles of splay oriented liquid crystal molecules contained in the liquid crystal alignment film.

The tilt angle can be obtained by measuring phase difference values at each angle according to the manual of the manufacturer using an Axoscan from Axometrics, which is an intrument capable of measuring phase differences, and then being calculated from the measured phase difference values.

In this specification, when the term such as vertical, horizontal, orthogonal or parallel is used while defining an angle, it means substantially vertical, horizontal, orthogonal, or parallel to the extent that the desired effect is not impaired, which includes, for example, an error that takes a production error or a deviation (variation), and the like, into account. For example, each case of the foregoing may include an error within about ±15 degrees, an error within about ±10 degrees or an error within about ±5 degrees.

The first substrate and the second substrate are portions to which a voltage is externally applied in order to change the arrangement of liquid crystal molecules in the transmittance-variable liquid crystal layer.

The first substrate may comprise a first electrode film and a first non-liquid crystal alignment film formed on the first electrode film and the second substrate may comprise a second electrode film and a second non-liquid crystal alignment film formed on the second electrode film. Specifically, the first electrode film may have a first electrode layer formed on a first base film, and the second electrode film may have a second electrode layer formed on a second base film.

In addition, at least one of the first substrate and the second substrate may have the liquid crystal alignment film, and specifically, the liquid crystal alignment film may be formed on at least one of the first non-liquid crystal alignment film of the first substrate and the second non-liquid crystal alignment film of the second substrate.

In one example, the liquid crystal alignment film may be formed on any one of the first non-liquid crystal alignment film and the second non-liquid crystal alignment film, and in one embodiment, the liquid crystal alignment film may be formed on the second non-liquid crystal alignment film.

In another example, the liquid crystal alignment film may be formed on both the first non-liquid crystal alignment film and the second non-liquid crystal alignment film.

As the first base film and the second base film, those having optical transparency can be used. For example, as the first base film and the second base film, an optically transparent plastic film or sheet can be used or glass can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthalate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluororesin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present application.

As the first electrode layer and the second electrode layer, a transparent conductive layer may be used. For example, as the first electrode layer and the second electrode layer, one formed by depositing a conductive polymer, a conductive metal, a conductive nanowire, or a metal oxide such as ITO (Indium Tin Oxide), and the like may be used. In one embodiment, as the first electrode layer and the second electrode layer, indium tin oxide (ITO) may be used.

In this specification, the term "transmittance-variable liquid crystal layer" means a layer in which the oriented state of liquid crystal molecules is changed by a voltage applied from the outside.

The transmittance-variable liquid crystal layer can control the pretilt of the liquid crystal molecules included in the transmittance-variable liquid crystal layer upon no voltage application, that is, in the initial state, by controlling the tilt angle of splay oriented liquid crystal molecules included in the liquid crystal alignment film to control the oriented state. The tilt angle of the liquid crystal alignment film can be controlled to a desired size according to the curing temperature upon producing the first and/or second non-liquid crystal alignment films present in the lower part.

In one example, when the average tilt angle of the liquid crystal alignment film is in a range of 0.2 to 20 degrees, the transmittance-variable liquid crystal layer may have the horizontal orientation upon no voltage application. Specifically, the average tilt angle of the liquid crystal alignment film for the transmittance-variable liquid crystal layer to have the horizontal orientation upon no voltage application may be 0.6 to 18.3 degrees, 1.0 to 16.6 degrees, 1.4 to 14.9 degrees, or 1.8 to 13.2 degrees. When the transmittance-variable liquid crystal layer has the horizontal orientation, the average tilt angle of the liquid crystal alignment film satisfies the above-described range, so that a small reverse tilt domain is generated in the transmittance-variable liquid crystal layer, whereby driving uniformity can be ensured.

At this time, the curing temperature of the first and/or second non-liquid crystal alignment films for the transmittance-variable liquid crystal layer to have the horizontal orientation upon no voltage application may be 20° C. to 70° C., specifically 30° C. to 65° C. or 40° C. to 60° C. By controlling the curing temperature of the non-liquid crystal alignment film within the above-described range, a small reverse tilt domain is generated in the transmittance-variable liquid crystal layer, so that driving uniformity can be ensured.

Also, in order for the transmittance-variable liquid crystal layer to have the horizontal orientation upon no voltage application, the minimum tilt angle of the liquid crystal alignment film may be 0 to 0.4 degrees and the maximum tilt angle of the liquid crystal alignment film may be 0.2 to 45 degrees, and specifically, the minimum tilt angle of the liquid crystal alignment film may be 0 to 0.3 degrees, 0 to 0.2 degrees or 0 to 0.1 degrees, and the maximum tilt angle of the liquid crystal alignment film may be 1 to 45 degrees, 10 to 45 degrees, or from 20 to 45 degrees.

In another example, when the average tilt angle of the liquid crystal alignment film is 30 to 90 degrees, the transmittance-variable liquid crystal layer may have the vertical orientation upon no voltage application. Specifically, the average tilt angle of the liquid crystal alignment film for the transmittance-variable liquid crystal layer to have the vertical orientation upon no voltage application may be 35 degrees to 75 degrees, 40 degrees to 60 degrees, or 44 degrees to 45 degrees. When the transmittance-variable liquid crystal layer has the vertical orientation, the average tilt angle of the liquid crystal alignment film satisfies the above-mentioned range, so that a small reverse tilt domain is generated in the transmittance-variable liquid crystal layer, whereby driving uniformity can be ensured.

At this time, the curing temperature of the first and/or second non-liquid crystal alignment films for the transmittance-variable liquid crystal layer to have the vertical orientation upon no voltage application may be more than 70° C. to 90° C., specifically 75° C. to 85° C. or 78° C. to 82° C. By controlling the curing temperature of the first and/or second non-liquid crystal alignment films within the above-described range, a small reverse tilt domain is generated when the transmittance-variable liquid crystal layer has the vertical orientation, so that driving uniformity can be ensured.

Also, in order for the transmittance-variable liquid crystal layer to have the vertical orientation upon no voltage application, the minimum tilt angle of the liquid crystal alignment film may be 0 to 88 degrees and the maximum tilt angle of the liquid crystal alignment film may be 0 to 90 degrees, and specifically, the minimum tilt angle of the liquid crystal alignment film may be 10 degrees to 80 degrees, 20 degrees to 70 degrees, 30 degrees to 60 degrees or 40 degrees to 50 degrees, and the maximum tilt angle may be 10 degrees to 80 degrees, 20 degrees to 70 degrees, 30 degrees to 60 degrees or 40 degrees to 50 degrees.

The transmittance-variable liquid crystal layer may comprise non-reactive liquid crystals and a dichroic dye. The non-reactive liquid crystal may mean a liquid crystal compound having no polymerizable group. Here, the polymerizable group may be exemplified by an acryloyl group, an acryloyloxy group, a methacryloyl group, a methacryloyloxy group, a carboxyl group, a hydroxyl group, a vinyl group or an epoxy group, and the like, but is not limited thereto, and known functional groups noted as the polymerizable group may be included. As the non-reactive liquid crystal, for example, a smectic liquid crystal compound, a nematic liquid crystal compound or a cholesteric liquid crystal compound, and the like can be used.

The transmittance-variable liquid crystal layer may comprise a non-reactive liquid crystal having negative or positive dielectric constant anisotropy. The dielectric constant anisotropy of the liquid crystal can be appropriately selected in accordance with a drive mode to be described below. In this specification, the term "dielectric constant anisotropy ($\Delta\varepsilon$)" can mean a difference ($\varepsilon// - \varepsilon v$) between the horizontal dielectric constant ($\varepsilon//$) and the vertical dielectric constant ($\varepsilon v$) of the liquid crystal. The term "horizontal dielectric constant ($\varepsilon//$)" herein means a dielectric constant value measured along the direction of the electric field in a state where a voltage is applied so that the director of the liquid crystal molecule and the direction of the electric field by the applied voltage are substantially horizontal, and the "vertical dielectric constant ($\varepsilon v$)" means a dielectric constant value measured along the direction of the electric field in a state where a voltage is applied so that the director of the liquid crystal molecule and the direction of the electric field by the applied voltage are substantially vertical.

The dichroic dye can improve a light shielding ratio of the transmittance-variable film to contribute to transmittance variation. In this specification, the term "dye" may mean a material that is capable of intensively absorbing and/or modifying light in at least some or all the entire range within a visible light region, for example, within a wavelength range of 400 nm to 700 nm. Furthermore, in this specification, the term "dichroic dye" may mean a material capable of performing anisotropic absorption of light in at least some or the entire range of the visible light region. As the dichroic dye, for example, known dyes noted to have properties that can be aligned according to the alignment state of the liquid crystal can be selected and used, for example, black dyes can be used. Such a dye is known, for example, as an azo dye or an anthraquinone dye, but is not limited thereto.

The splay oriented liquid crystal contained in the liquid crystal alignment film may be a reactive liquid crystal. The reactive liquid crystal may mean a liquid crystal compound having at least one polymerizable functional group. As long as the reactive liquid crystal is a liquid crystal compound having the above-described polymerizable functional group in the transmittance-variable liquid crystal layer, it is not limited thereto, but may include, for example, one or a mixture of two or more of cyanobiphenyl acrylate, cyanophenyl cyclohexane acrylate, cyanophenyl ester acrylate, benzoic acid phenyl ester acrylate, or phenylpyrimidine acrylate, and the like.

In one example, the liquid crystal alignment film may have a thickness of 300 nm to 3000 nm. Specifically, the thickness of the liquid crystal alignment film may be 400 nm to 2500 nm, 500 nm to 2000 nm, 600 nm to 1500 nm, or 700 nm to 1000 nm. If the thickness of the liquid crystal alignment film is too thin, coatability and in-plane uniformity problems may occur, and if the thickness of the liquid crystal alignment film is too thick, the liquid crystal molecules of the transmittance-variable liquid crystal layer may have weak influence on the liquid crystal alignment film to exhibit disordered orientation states.

The transmittance-variable liquid crystal layer may be disposed on the liquid crystal alignment film included in at least one of the first non-liquid crystal alignment film and the second non-liquid crystal alignment film. For example, in the liquid crystal alignment film, the liquid crystal molecules having the maximum tilt angle may be disposed closer to the transmittance-variable liquid crystal layer than the liquid crystal molecules having the minimum tilt angle, the liquid crystal molecules having the minimum tilt angle may be disposed closer to the transmittance-variable liquid crystal layer than the liquid crystal molecules having the maximum tilt angle and the liquid crystal molecules having a medium tilt angle may also be disposed closer to the transmittance-variable liquid crystal layer than the liquid crystal molecules having the minimum tilt angle and the maximum tilt angle. As the liquid crystal alignment film is disposed as described above, it can control the liquid crystal pretilt at the liquid crystal interface with the transmittance-variable liquid crystal layer, thereby controlling the initial alignment state of the liquid crystal molecules in the transmittance-variable liquid crystal layer.

The first non-liquid crystal alignment film and the second non-liquid crystal alignment film are films for orienting liquid crystal molecules adjacent to each alignment film, for example, liquid crystal molecules included in the liquid crystal alignment film or the transmittance-variable liquid crystal layer, in a predetermined direction. The first non-liquid crystal alignment film and the second non-liquid crystal alignment film may be included in the first substrate and the second substrate, respectively, and specifically, the first non-liquid crystal alignment film may be formed on the first electrode film and the second non-liquid crystal alignment film may be formed on the second electrode film.

The thicknesses of the first non-liquid-crystal alignment film and the second non-liquid-crystal alignment film can be appropriately selected and controlled within a range without impairing the object of the present application. For example, the first non-liquid crystal alignment film and the second non-liquid crystal alignment film may be coated in a thickness range of about 1 µm or less and used in view of suitably inducing the orientation of the liquid crystal molecules contained in the liquid crystal alignment film and the transmittance-variable liquid crystal layer, which can be appropriately adjusted as needed.

As the first non-liquid crystal alignment film and the second non-liquid crystal alignment film, a non-contact type alignment film such as a photo-alignment film can be used. The photo-alignment film may comprise a photo-orientable material. In the present application, the photo-orientable material may mean a material capable of being aligned in a predetermined direction (orientationally ordered) through light irradiation and also orienting adjacent liquid crystal compounds or the like in the predetermined direction in the aligned state. As the photo-orientable material, for example, a photo-orientable compound exhibiting liquid crystal orientation through a photoisomerization reaction, a photolysis reaction or a photodimerization reaction by polarized ultraviolet irradiation can be used.

The photo-orientable compound may be, for example, a compound containing a photosensitive moiety. Photo-orientable compounds which can be used for the orientation of liquid crystal compounds are variously known. As the photo-orientable compound, for example, a compound aligned by trans-cis photoisomerization; a compound aligned by photo-destruction such as chain scission or photo-oxidation; a compound aligned by photo-crosslinking or photopolymerization such as [2+2] cycloaddition, [4+4] cycloaddition or photodimerization; a compound aligned by photo-Fries rearrangement or a compound aligned by a ring opening/closure reaction, and the like can be used. The compound aligned by trans-cis photoisomerization can be exemplified by an azo compound such as a sulfonated diazo dye or an azo polymer or a stilbene compound, and the like, and the compound aligned by photo-destruction can be exemplified by cyclobutane tetracarboxylic dianhydride (cyclobutane-1,2,3,4-tetracarboxylic dianhydride), aromatic polysilane or polyester, polystyrene or polyimide, and the like. Furthermore, the compound aligned by photo-crosslinking or photo-polymerization can be exemplified by a cinnamate compound, a coumarin compound, a cinnamamide compound, a tetrahydrophthalimide compound, a maleimide compound, a benzophenone compound or a diphenylacetylene compound, or a compound having a chalconyl residue (hereinafter, chalcon compound) or a compound having an anthracenyl residue (hereinafter, anthracenyl compound) as a photosensitive moiety, and the like, the compound aligned by photo-Fries rearrangement can be exemplified by an aromatic compound such as a benzoate compound, a benzoamide compound and a methacrylamidoaryl methacrylate compound, and the compound aligned by a ring opening/closure reaction can be exemplified by a compound aligned by the ring opening/closure reaction of [4+2] π electronic system such as a spiropyran compound, and the like, without being limited thereto.

The photo-orientable compound may be a monomolecular compound, a monomeric compound, an oligomeric compound or a polymeric compound, or a blend form of the photo-orientable compound and a polymer. Here, the oligomeric or polymeric compound may have a residue derived from the above-described photo-orientable material or the above-described photosensitive moiety in the main chain or side chain.

The polymer having a residue derived from the photo-orientable compound or a photosensitive moiety or capable of being mixed with the photo-orientable compound can be exemplified by polynorbornene, polyolefin, polyarylate, polyacrylate, poly(meth)acrylate, polyimide, poly(amic acid), polymaleinimide, polyacrylamide, polymethacrylamide, polyvinyl ether, polyvinyl ester, polystyrene, polysiloxane, polyacrylonitrile or polymethacrylonitrile, and the like, but is not limited thereto.

The polymer that may be included in the photo-orientable compound can be exemplified by, typically, polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate, and the like, but is not limited thereto.

The photo-alignment film may have an appropriate surface roughness for uniform application and fixation of a ball spacer to be described below. The surface roughness, for example, a surface roughness (Ra) may be 3 nm to 100 nm. The surface roughness can be carried out by, for example, a) a process of coating a composition comprising nanoparticles, a curable resin and a solvent on a base material, followed by drying and curing; b) a process of stamping a base material with a mold; c) a process of eroding a flat base material with a partially erodible solvent; and d) a process of applying physical force to a flat base material.

The transmittance-variable film may further comprise a ball spacer as a cell gap holding member for maintaining a cell gap between the first substrate and the second substrate.

In one embodiment, the ball spacer may be included in a state fixed to the first non-liquid crystal alignment film of the first substrate. In this specification, the fact that the ball spacer is fixed to the first non-liquid crystal alignment film means that the ball spacer is firmly stuck to the first non-liquid crystal alignment film. Specifically, in this specification, the fact that the ball spacer is fixed to the first non-liquid crystal alignment film is a meaning different from that the ball spacer simply contacts the alignment film, which may mean a state where the ball spacer is fixed to one side of the alignment film, so that there is no motion by external force or pressure. It can be confirmed whether or not the spacer is fixed to the alignment film, for example, by determining which alignment film the spacer remains upon decomposition of the liquid crystal cell. In one example, the bottom of the ball spacer may be fixed to the first non-liquid crystal alignment film via a cured product formed on the top of the first non-liquid crystal alignment film. In one example, the cured product may exist in a plurality of regions spaced apart from each other on the first non-liquid crystal alignment film.

The cured product may have an inclined surface on the side. The upper surface of the cured product may have a concave portion corresponding to the convex portion of the lower surface of the ball spacer. The concave portion of the upper surface of the cured product and the convex portion of the lower surface of the ball spacer may be in close contact with each other.

The cured product may comprise a curable material. As the curable material, a heat-curable material or a photo-curable material may be used. As the photo-curable material, an ultraviolet curable material may be used. As the heat-curable material, for example, a silicone resin, a silicon resin, a furan resin, a polyurethane resin, an epoxy resin, an amino resin, a phenol resin, a urea resin, a polyester resin or a melamine resin, and the like can be used. As the ultraviolet curable material, typically, an acrylic polymer, for example, a polyester acrylate polymer, a polystyrene acrylate polymer, an epoxy acrylate polymer, a polyurethane acrylate polymer or a polybutadiene methacrylate polymer, a silicone acrylate polymer or an alkyl acrylate polymer, and the like can be used.

The top of the ball spacer may contact the liquid crystal alignment film. The ball spacer may maintain an interval such that the transmittance-variable liquid crystal layer may be formed between the first non-liquid crystal alignment film and the liquid crystal alignment film.

The diameter of the ball spacer may be appropriately selected in consideration of the object of the present application. For example, the ball spacer may have a diameter of 2 μm to 100 μm, specifically, 8 μm to 30 μm. When the diameter of the ball spacer is in the above range, a proper interval can be maintained so that a liquid crystal layer can be formed between the first substrate and the second substrate.

The material constituting the ball spacer can be appropriately selected in consideration of the object of the present application. For example, the ball spacer (301) may comprise at least one selected from the group consisting of a carbon-based material, a metal-based material, an oxide-based material and a composite material thereof. When the ball spacer (301) is made of the above-described material, it may be suitable for realizing a transmittance-variable film.

As a method of forming the ball spacer, in one example, the ball spacer may be formed by applying the ball spacer composition before applying a composition for a transmittance-variable liquid crystal layer on a substrate. In this case, when the ball spacer composition further comprises a curable compound, a structure in which the ball spacer is fixed to the first substrate via a cured product can be realized. In another example, the ball spacer may be formed by mixing the ball spacer and the composition for a transmittance-variable liquid crystal layer and simultaneously applying them on the substrate. FIG. 2 illustratively shows a transmittance-variable film according to one embodiment of the present application. As shown in FIG. 2, the transmittance-variable film according to one embodiment of the present invention forms the transmittance-variable liquid crystal layer (300) via the ball spacer (301) for holding the cell gap between the first substrate (100) and the second substrate (200).

The first substrate (100) comprises the first electrode film (110) and the first non-liquid crystal alignment film (120), and the second substrate (200) comprises the second electrode film (210), the second non-liquid crystal alignment film (220) and the liquid crystal alignment film (230) containing splay oriented liquid crystals.

The transmittance-variable film according to one embodiment of the present invention comprises one liquid crystal alignment film (230) containing splay oriented liquid crystals, so that the liquid crystal molecules (302) included in the transmittance-variable liquid crystal layer (300) may exhibit the horizontal orientation upon no voltage application.

FIG. 3 also illustratively shows a transmittance-variable film according to another embodiment of the present application. As shown in FIG. 3, the transmittance-variable film according to another embodiment of the present invention forms the transmittance-variable liquid crystal layer (300) via the ball spacer (301) for holding a cell gap between the first substrate (100) and the second substrate (200).

The first substrate (100) comprises the first electrode film (110), the first non-liquid crystal alignment film (120) and the liquid crystal alignment film (130) containing splay oriented liquid crystals, and the second substrate (200) comprises the second electrode film (210), the second non-liquid crystal alignment film (220) and the liquid crystal alignment film (230) containing splay oriented liquid crystals.

The transmittance-variable film according to another embodiment of the present invention comprises two liquid crystal alignment films (230) containing splay oriented liquid crystals, so that the liquid crystal molecules (302) included in the liquid crystal layer (300) may exhibit the vertical orientation upon no voltage application.

In one example, the transmittance-variable liquid crystal layer (300) may have a reverse tilt domain size of 80 μm or less. Specifically, the upper limit of the reverse tilt domain size of the transmittance-variable liquid crystal layer (300) may be 60 μm or less, or 40 μm or less, and the lower limit of the reverse tilt domain size of the transmittance-variable liquid crystal layer (300) is not particularly limited, but may be, for example, 10 μm or more. As the transmittance-variable liquid crystal layer (300) has a small size reverse tilt domain within the above-mentioned range, driving uniformity can be ensured.

The transmittance-variable film of the present application can vary transmittance by controlling the orientation direction depending on whether or not a voltage is applied to the transmittance-variable liquid crystal layer. In one example, the transmittance-variable liquid crystal layer can switch the vertical orientation and the horizontal orientation depending on whether or not a voltage is applied. In one example, the transmittance-variable film can realize a clear state upon horizontal orientation and can realize a dark state upon vertical orientation. In this specification, the clear state may mean a high transmittance state and the dark state may mean a low transmittance state. In one example, the transmittance at the clear state may be 40% or more, 45% or more, or 50% or more, and the transmittance at the dark state may be 5% or less, 4% or less, or 3% or less.

The transmittance-variable film can be driven in various modes by controlling pretilt by the liquid crystal alignment film. In one example, the transmittance-variable film may be implemented in a VA (vertically alignment) mode. In this case, the transmittance-variable liquid crystal layer may comprise a liquid crystal having negative dielectric constant anisotropy. In the case of being driven in the VA mode, the transmittance-variable liquid crystal layer may be in a vertically oriented state when no voltage is applied, and may be in a horizontally oriented state when a voltage is applied. In another example, the transmittance-variable film may be implemented in an ECB (electrically controlled birefringence) mode. In this case, the transmittance-variable liquid crystal layer may comprise a liquid crystal having positive dielectric constant anisotropy. In the case of being driven in the ECB mode, the transmittance-variable liquid crystal layer may be in a horizontally oriented state when no voltage is applied and may be in a vertically oriented state when a voltage is applied. By controlling the liquid crystal pretilt at the interface with the transmittance-variable liquid crystal layer using the liquid crystal alignment film containing splay oriented liquid crystals, the present application can control the orientation direction of the liquid crystal having negative or positive dielectric constant anisotropy upon on-off driving, so that the driving uniformity can be ensured. The transmittance-variable film may be further driven in a TN (twisted nematic) mode.

The present application also relates to a use of the transmittance-variable film. The transmittance-variable film of the present application can be applied to all the devices to which the transmittance-variation can be applied. For example, the transmittance-variable film of the present application can be applied to a sunroof, goggles, sunglasses or a helmet, and the like to provide transmittance-variable devices. As far as the transmittance-variable device comprises the transmittance-variable film of the present application, other parts, structures, and the like are not particularly limited, and all contents known in this field can be appropriately applied.

Advantageous Effects

The transmittance-variable film of the present application can control pretilt of a liquid crystal interface by applying a liquid crystal alignment film containing splay oriented liquid crystal molecules, and can vertically and horizontally orient a liquid crystal layer or a liquid crystal interface according to an average tilt angle of the liquid crystal alignment film to ensure uniformity of driving and fast response speed. In addition, by applying a liquid crystal alignment film, the transmittance-variable film of the present application can be implemented in various modes with a simple coating-drying-curing method excluding the rubbing process by controlling an arrangement of liquid crystal molecules in a liquid crystal alignment film other than the pretilt control method using the conventional rubbing method.

BRIEF DESCRIPTION OF DRAWINGS

FIG. 1 is a diagram illustratively showing a transmittance-variable film according to one embodiment of the present application.
FIG. 2 is a diagram showing transmittance-variable films of Examples 1 and 2.
FIG. 3 is a diagram showing a transmittance-variable film of Example 3.
FIG. 4 is a driving image of Example 1.
FIG. 5 is a driving image of Example 2.
FIG. 6 is a driving image of Comparative Example 1.
FIG. 7 is a graph showing the evaluation results of transmittance according to the driving voltage of Example 3.
FIG. 8 is a graph showing the evaluation results of transmittance according to the viewing angle of Example 3.

BEST MODE

Hereinafter, the present application will be described in detail by way of the following examples, but the scope of the present application is not limited by the following examples.

Example 1

Preparation of First Non-Liquid Crystal Alignment Film Composition 9.675 g of a solvent (cyclohexanone), 0.325 g of a photo-orientable material (5-norbornene-2-methyl-4-methoxy cinnamate) and 0.01 g of nanoparticles (PMMA, SEKISUI, average particle diameter: 370 nm) were added to a 20 ml vial and then mixed to prepare a first non-liquid crystal alignment film composition.

Preparation of Ball Spacer Composition 9.675 g of a solvent (cyclohexanone), 0.065 g of a photo-orientable material (5-norbornene-2-methyl-4-methoxy cinnamate) and 0.1 g of a ball spacer (KBN-510, SEKISUI, average particle diameter: 10 µm) were added to a 20 ml vial and then mixed to prepare a ball spacer composition.

Fabrication of First Substrate

The first non-liquid crystal alignment film composition was coated on an ITO layer of a first electrode film (PC/ITO film, width×length=100 mm×100 mm) to a thickness of about 300 nm using a mayer bar (#4). The coated composition was dried at about 80° C. for about 2 minutes. The dried composition was vertically (0°) irradiated with a polarized ultraviolet ray having an intensity of 200 mW/cm$^2$ at room temperature (25±5° C.) for 10 seconds and cured to form a first non-liquid crystal alignment film. Thereafter, the ball spacer composition was coated on the first non-liquid crystal alignment film to a thickness after drying of about 60 nm using a mayer bar (#10). The coated composition was dried at about 100° C. for about 2 minutes. The dried composition was vertically (0°) irradiated with a polarized ultraviolet ray having an intensity of about 200 mW/cm$^2$ for 10 seconds and the ball spacer was fixed on the first non-liquid crystal alignment film to fabricate a first substrate.

Preparation of Second Non-Liquid Crystalline Alignment Film Composition 9.675 g of a solvent (cyclohexanone) and 0.325 g of a photo-orientable material (5-norbornene-2-methyl-4-methoxy cinnamate) were added to a 20 ml vial and then mixed to prepare a second non-liquid crystal alignment film composition.

Fabrication of Second Substrate

The second non-liquid crystal alignment film composition was coated on an ITO layer of a second electrode film (PC/ITO film, width×length=100 mm×100 mm) to a thickness after drying of about 300 nm using a mayer bar (#4). The coated composition was dried at about 80° C. for about 2 minutes. The dried composition was vertically (0°) irradiated with a polarized ultraviolet ray having an intensity of 200 mW/cm$^2$ at room temperature (25±5° C.) for 10 seconds and cured to form a second non-liquid crystal alignment film. Thereafter, a splay orientable liquid crystal mixture (trade name: RMM667, manufacturer: MERCK) dissolved in toluene at 25 wt % was applied on the second non-liquid crystal alignment film using a mayer bar (#4) to form a liquid crystal alignment film. Thereafter, the liquid crystal alignment film was dried in an oven at 80° C. for 2 minutes. After drying, the alignment film was irradiated with an ultraviolet ray having an intensity of 300 mW/cm$^2$ at 40° C. for about 10 seconds and cured to fabricate a second substrate on which the liquid crystal alignment film with a thickness of 1000 nm was formed.

Cell Lamination

After applying 1 g of a composition for a transmittance-variable liquid crystal layer (MDA-14-4145, Merck) containing positive liquid crystals and an azo-based dye on the first non-liquid crystal alignment film of the first substrate, the second substrate was laminated so that the second non-liquid crystal alignment film contacted the ball spacer to fabricate a liquid crystal cell as in FIG. 2.

Example 2

A liquid crystal cell was fabricated in the same manner as in Example 1, except that when the second non-liquid crystal alignment film composition was coated, the curing temperature after drying was changed to 60° C.

Example 3

Fabrication of First Substrate

A first substrate was fabricated in the same manner as in Example 1, except that when the second non-liquid crystal alignment film composition was coated, the curing temperature after drying was changed to 80° C.

Fabrication of Second Substrate

A second substrate was fabricated in the same manner as in Example 1, except that when the second non-liquid crystal alignment film composition was coated, the curing temperature after drying was changed to 80° C.

Cell Production

On the second non-liquid crystal alignment film of the first substrate, a solution for a transmittance-variable liquid crystal layer, in which 100 mg of an azo-based dye (X12, BASF) and 1 g of a negative liquid crystal composition (MAT-13-1422, Merck) were mixed, and a ball spacer (KBN-510, SEKISUI) were applied, and then the first substrate was laminated with the second substrate to produce a liquid crystal cell as in FIG. 3.

Comparative Example

A liquid crystal cell was produced in the same manner as in Example 1, except that a horizontal orientable liquid crystal mixture (RMM1290, Merck) was used in place of the splay orientable liquid crystal mixture upon fabrication of the second substrate.

Measurement Example 1: Measurement of Average Tilt Angle

For the second non-liquid crystal alignment films of the second substrates in Examples 1 to 3 and Comparative Example, tilt angles were measured and the average values thereof were described in Table 1 below. The tilt angle of the second non-liquid crystal alignment film of the second substrate was measured by measuring and simulating the phase difference values at each angle using an Axoscan equipment from Axometics, and the average value thereof was calculated. Specifically, after fabricating the second non-liquid crystal alignment film of the second substrate, the phase difference was measured at 1° intervals from 60° to −60°, and then the tilt angle was measured through fitting simulation, and the average value was calculated.

TABLE 1

| Classification | Average tile angle (unit: °) |
| --- | --- |
| Example 1 | 5.8 |
| Example 2 | 13.2 |
| Example 3 | 44.5 |
| Comparative Example | 0.1 |

Evaluation Example 1: Domain Size Evaluation (Microscope Observation)

It was evaluated whether or not the liquid crystal cells of Examples 1 and 2 and Comparative Example were uniformly driven. Specifically, the size of the reverse tilt domain in which the liquid crystal was expressed in the low voltage driving of 3 V, that is, the region in which the liquid crystal molecules had different directions at the time of tilting, was evaluated by a method of measuring it with a microscope.

FIGS. 4 to 6 are micrographs (50 magnification) in which the liquid crystal cells of Examples 1 and 2 and Comparative Example were measured at a driving voltage of 3 V (AC), respectively. From FIG. 4, a reverse tilt domain having a size of about 30 μm to 80 μm was observed in Example 1, and from FIG. 5, a reverse tilt domain having a size of about 10 μm to 30 μm was observed in Example 2, and from FIG. 6, a reverse tilt domain having a size of about 150 μm to 500 μm was observed in Comparative Example. That is, as the average tilt angle shown in Table 1 is larger, a smaller reverse tilt domain is generated, and it can be seen that Examples are driven more uniformly than Comparative Example.

Evaluation Example 2: Evaluation of Transmittance According to Voltage

For the liquid crystal cell of Example 3 showing the initial vertical orientation, the average transmittance according to the driving voltage application at a wavelength of 400 nm to 700 nm was measured and the results were shown in Table 2 and FIG. 7 below. It exhibited a clear mode at the transmittance of about 26.6% when no voltage was applied (0 V), and switched to a dark mode at the transmittance of about 4.52% when a voltage of about 20 V was applied. As a result, when the average tilt angle of the second non-liquid crystal alignment film was increased by about 45°, it could be seen that the vertical orientation was possible.

TABLE 2

| Driving voltage (V) | Transmittance (%) |
| --- | --- |
| 0 | 26.6 |
| 5 | 9.23 |
| 10 | 5.54 |
| 20 | 4.52 |

Evaluation Example 3: Evaluation of Transmittance According to Viewing Angle

For the liquid crystal cell of Example 3, the average transmittance according to the viewing angle at a wavelength of 400 nm to 700 nm was measured, and the results were shown in FIG. 8. Specifically, the transmittance according to the viewing angle (polar angle) at an azimuthal angle of 90° upon no voltage application (0V). As a result of the measurement, it could be confirmed that the vertical orientation was well performed.

EXPLANATION OF REFERENCE NUMERALS

100: first substrate
110: first electrode film
120: first non-liquid crystal alignment film
121: cured product
130: liquid crystal alignment film
200: second substrate
210: second electrode film
220: second non-liquid crystal alignment film
230: liquid crystal alignment film
300: transmittance-variable liquid crystal layer
301: ball spacer
302: liquid crystal molecule

The invention claimed is:

1. A transmittance-variable film comprising:
   a first substrate,
   a transmittance-variable liquid crystal layer comprising non-reactive liquid crystals and a dichroic dye, and
   a second substrate in sequence,
   wherein the non-reactive liquid crystals are liquid crystals that have no polymerizable group,
   wherein the first substrate comprises a first alignment film, wherein the first alignment film does not contain a liquid crystal, wherein the second substrate comprises a second alignment film, wherein the second alignment film contains reactive liquid crystals, wherein the reactive liquid crystals are in a splay oriented state where a tilt angle of the reactive liquid crystals changes along a thickness direction of the second alignment film, wherein an average tilt angle of the reactive liquid crystals ranges from 0.2 degrees to 20 degrees, wherein the first alignment film is directly on the transmittance-variable liquid crystal layer, wherein the second alignment film is directly on the transmittance-variable liquid crystal layer, wherein the non-reactive liquid crystals have a horizontal orientation when no voltage is applied, wherein the non-reactive liquid crystals of transmittance-variable liquid crystal layer are horizontally oriented when no voltage is applied by the average tilt angle of the reactive liquid crystals being in the splay oriented state in the second alignment film.

2. The transmittance-variable film according to claim 1, wherein the first substrate further comprises a first electrode film and the first alignment film is formed on the first electrode film, and the second substrate further comprises a second electrode film and a third alignment film formed on the second electrode film, wherein the third alignment film does not contain a liquid crystal, and the second alignment film is formed on the third alignment film.

3. The transmittance-variable film according to claim 2, wherein the first and third alignment films are each a photo-alignment film.

4. The transmittance-variable film according to claim 1, further comprising a ball spacer between the first substrate and the second substrate.

5. The transmittance-variable film according to claim 4, wherein the ball spacer comprises at least one selected from the group consisting of a carbon-based material, a metal-based material, an oxide-based material, and a composite material.

6. The transmittance-variable film according to claim 1, wherein reactive liquid crystals are liquid crystal compounds having at least one polymerizable functional group.

7. The transmittance-variable film according to claim 1, wherein the transmittance-variable film realizes a clear state upon horizontal orientation of the non-reactive liquid crystals and a dark state upon vertical orientation of the non-reactive liquid crystals, wherein a transmittance of the transmittance-variable film at the clear state is 40% or more and the transmittance at the dark state is 5% or less.

8. A transmittance-variable film comprising a first substrate, a transmittance-variable liquid crystal layer and a second substrate in sequence, wherein at least one of the first substrate or the second substrate comprises an alignment film containing splay oriented liquid crystals, wherein the alignment film has an average tilt angle of 30 degrees to 90 degrees and the transmittance-variable liquid crystal layer has vertical orientation when no voltage is applied.

9. The transmittance-variable film according to claim 1, wherein the second alignment film has a thickness of 300 nm to 3000 nm.

10. The transmittance-variable film according to claim 1, wherein the transmittance-variable liquid crystal layer has a reverse tilt domain size of 80 μm or less.

11. The transmittance-variable film according to claim 1, wherein the transmittance-variable liquid crystal layer has a reverse tilt domain size of 10 μm to 80 μm.

\* \* \* \* \*